(12) United States Patent
Park et al.

(10) Patent No.: US 9,685,107 B2
(45) Date of Patent: Jun. 20, 2017

(54) DISPLAY APPARATUS

(75) Inventors: Gyung-Soon Park, Yongin (KR); Sung-Ho Cho, Yongin (KR); Seung-Jae Lee, Yongin (KR); Jae-Min Shin, Yongin (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 425 days.

(21) Appl. No.: 13/200,987

(22) Filed: Oct. 6, 2011

(65) Prior Publication Data

US 2012/0120119 A1  May 17, 2012

(30) Foreign Application Priority Data

Nov. 11, 2010  (KR) .................. 10-2010-0112070

(51) Int. Cl.
  *G09G 3/36* (2006.01)
  *G09G 3/20* (2006.01)
  *G02F 1/1333* (2006.01)
  *G02F 1/1335* (2006.01)

(52) U.S. Cl.
  CPC ..... *G09G 3/2003* (2013.01); *G02F 1/133371* (2013.01); *G02F 1/133514* (2013.01); *G02F 2201/52* (2013.01); *G09G 2300/0452* (2013.01); *G09G 2340/06* (2013.01)

(58) Field of Classification Search
  CPC ............ G02B 2027/0187; G02B 27/01; G02B 27/0189; G06F 3/012; G06F 3/0346
  USPC ......... 345/107, 690, 211, 72, 76–77; 257/72
  See application file for complete search history.

(56) References Cited

U.S. PATENT DOCUMENTS

| | | | |
|---|---|---|---|
| 2004/0183767 A1* | 9/2004 | Koo et al. ........................ 345/92 |
| 2004/0245526 A1* | 12/2004 | Park .................... G02F 1/13454 257/72 |
| 2006/0007077 A1* | 1/2006 | Joo ....................... G09G 3/3208 345/77 |
| 2006/0012614 A1* | 1/2006 | Asao et al. ................... 345/690 |
| 2006/0238459 A1* | 10/2006 | Huang ............................ 345/76 |
| 2007/0132674 A1* | 6/2007 | Tsuge ................... G09G 3/2014 345/77 |
| 2007/0205968 A1* | 9/2007 | Chen .................... G09G 3/2003 345/76 |
| 2008/0048560 A1* | 2/2008 | Sung et al. .................... 313/504 |
| 2008/0278433 A1* | 11/2008 | Lee et al. ...................... 345/107 |

(Continued)

FOREIGN PATENT DOCUMENTS

| | | |
|---|---|---|
| JP | 2006-308796 A | 11/2006 |
| KR | 10-2004-0007822 A | 1/2004 |

(Continued)

OTHER PUBLICATIONS

Office Action from the Korean Intellectual Property Office on Feb. 27, 2017 with respect to Korean Patent Application No. 10-2010-0112070.

*Primary Examiner* — Tony Davis
(74) *Attorney, Agent, or Firm* — Lee & Morse, P.C.

(57) ABSTRACT

A display apparatus includes a first substrate and a second substrate opposite to the first substrate. The first substrate includes a plurality of color pixels and a white pixel that outputs a second white light having a same gray scale as a first white light formed by mixing light outputted from the plurality of color pixel. The white pixel is activated by a second current that is lower than a first current that activates the color pixels.

9 Claims, 10 Drawing Sheets

(56) References Cited

U.S. PATENT DOCUMENTS

2010/0078647 A1* 4/2010 Eom ................... H01L 27/1285
                                                         257/72
2010/0128202 A1* 5/2010 Chu Ke et al. ................. 349/69
2015/0287378 A1* 10/2015 Jeong ................... G09G 3/3688
                                                         345/694

FOREIGN PATENT DOCUMENTS

| KR | 10-2004-0081522 A | 9/2004 |
| KR | 10-2006-0075814 A | 7/2006 |
| KR | 10-2006-0120878 A | 11/2006 |
| KR | 10-0836430 B1 | 6/2008 |
| KR | 10-2008-0097511 A | 9/2008 |

* cited by examiner

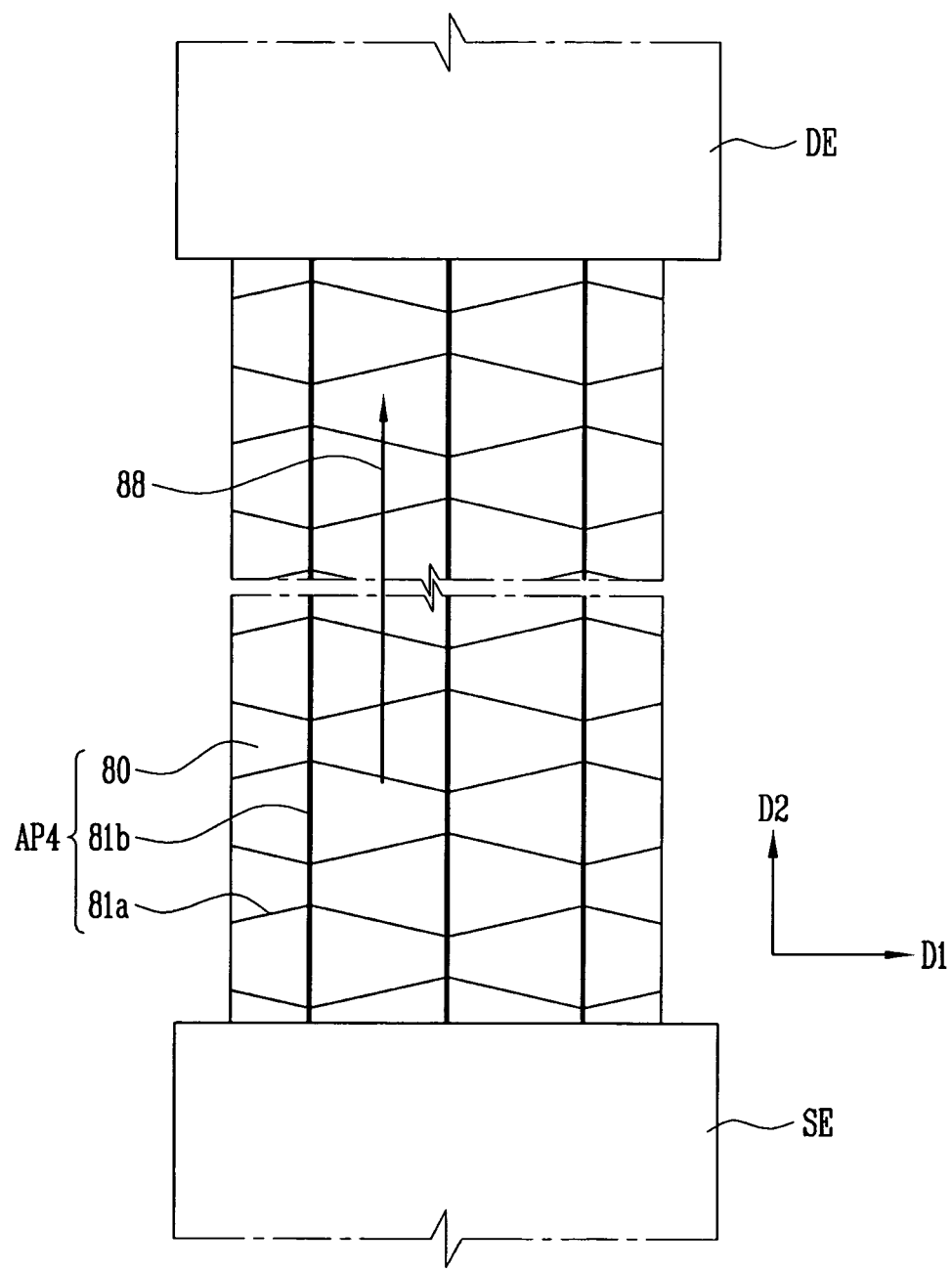

DISPLAY APPARATUS

CROSS-REFERENCE TO RELATED APPLICATION

This application claims priority to and the benefit of Korean Patent Application No. 10-2010-0112070, filed on Nov. 11, 2010, in the Korean Intellectual Property Office, the entire content of which is incorporated herein by reference.

BACKGROUND

Embodiments relate to a display apparatus and to a display apparatus having improved display quality. Display apparatuses may display images by using unit pixels. The unit pixels may be implemented by a combination of red pixels, green pixels, and blue pixels.

SUMMARY

Embodiments may be realized by providing a display apparatus that includes a first substrate, and a second substrate opposite to the first substrate. The first substrate includes a plurality of color pixels, and a white pixel that outputs a second white light having the same gray scale as the gray scale of a first white light formed by mixing light outputted from the color pixels, and is operated by second current lower than first current that activates the color pixels.

The white pixel and the color pixels may implement a unit pixel, and the color filters may include a red pixel, a green pixel, and a blue pixel. The red pixel, the green pixel, and the blue pixel may each include a first thin film transistor and a pixel electrode electrically connected with the first thin film transistor, the white pixel may include a second thin film transistor and a pixel electrode electrically connected with the second thin film transistor, and the length of a channel area of the second thin film transistor may be larger than the length of a channel area of the fist thin film transistor. Electric resistance of the channel area of the second thin film transistor may be larger than electric resistance of the channel area of the first thin film transistor.

The first thin film transistor may include a first active pattern and a first gate electrode, and the second thin film transistor may include a second active pattern and a second gate electrode having a larger width than the first gate electrode. The channel area of the first thin film transistor may be defined as the portion overlapping the first gate electrode in the first active pattern, in a plane. The channel area of the second thin film transistor may be defined as the portion overlapping the second gate electrode in the second active pattern, in a plane.

The red pixel, the green pixel, and the blue pixel may each include a first thin film transistor switching the first current and a pixel electrode electrically connected with the first thin film transistor. The white pixel may include a second thin film transistor switching the second current and a pixel electrode electrically connected with the second thin film transistor. The first active pattern of the first thin film transistor and the second active pattern of the second thin film transistor may each include anisotropic semiconductor crystals. The first active pattern may further include a portion extending in a first direction, and the second active pattern may include a portion extending in a second direction different from the first direction. The longitudinal directions of the semiconductor crystals may be parallel with the first direction.

The first current may flow in the first direction in the first active pattern and the second current may flow in the second direction in the second active pattern. The second active pattern may further include a portion extending in the first direction, and the larger the portion extending in the second direction than the portion extending in the first direction, the more the magnitude of the second current reduces, such that luminance of a white light from the white pixel may be reduced. The first direction and the second direction may be perpendicular in a plane.

The second substrate may include a plurality of color filters. The color filters may include a red filter opposite to the red pixel, a green filter opposite to the green pixel, and a blue filter opposite to the blue pixel. The color filters may be positioned not opposite to the white pixel. The second substrate may include a plurality of color filters. The color filters may include a red filter opposite to the red pixel, a green filter opposite to the green pixel, a blue filter opposite to the blue pixel, and a white filter opposite to the white pixel. The thickness of the white filter may be the same as or less than the thicknesses of the red filter, the green filter, and the blue filter.

The display apparatus may further include a liquid crystal between the first substrate and the second substrate, and a light source emitting light to the first substrate and the second substrate.

BRIEF DESCRIPTION OF THE DRAWINGS

Features will become apparent to those of ordinary skill in the art by describing in detail exemplary embodiments with reference to the attached drawings in which:

FIG. 9 illustrates a view enlarging the fourth active pattern shown in FIG. 8.

DETAILED DESCRIPTION

Figure 1:
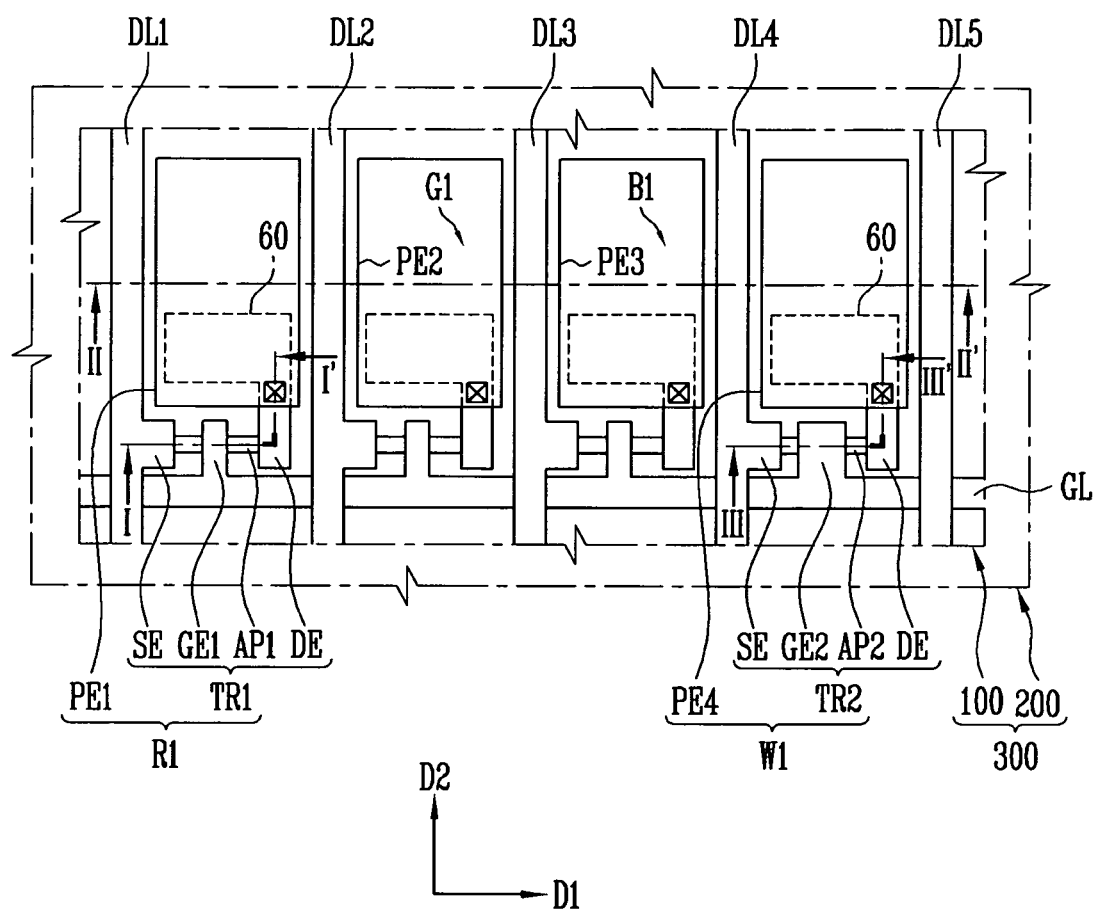
FIG. 1 illustrates a plan view of a display apparatus, according to an exemplary embodiment.

Korean Patent Application No. 10-2010-0112070, filed on Nov. 11, 2010, in the Korean Intellectual Property Office, and entitled: "Display Apparatus" is incorporated by reference herein in its entirety.

Hereinafter, exemplary embodiments will be described in detail with reference to the accompanying drawings. The objects, features, and effects of the present invention will be easily understood from the embodiments relating to the accompanying drawings. However, embodiments are not limited to the exemplary embodiments described herein and may be modified in various ways. Preferably, the following embodiments are provided to make the scope of the invention clear and also sufficiently provide the scope of the present invention to those skilled in the art. Therefore, claims should not be construed as being limited to the following embodiments. Meanwhile, the drawings provided in connection with the following embodiments are relatively simplified or exaggerated for clear description and the same reference numerals in the drawings designate the same components.

In the figures, the dimensions of layers and regions may be exaggerated for clarity of illustration. It will also be understood that when a layer or element is referred to as being "on" another layer or substrate, it can be directly on the other layer or substrate, or intervening layers may also be present.

Figure 2:
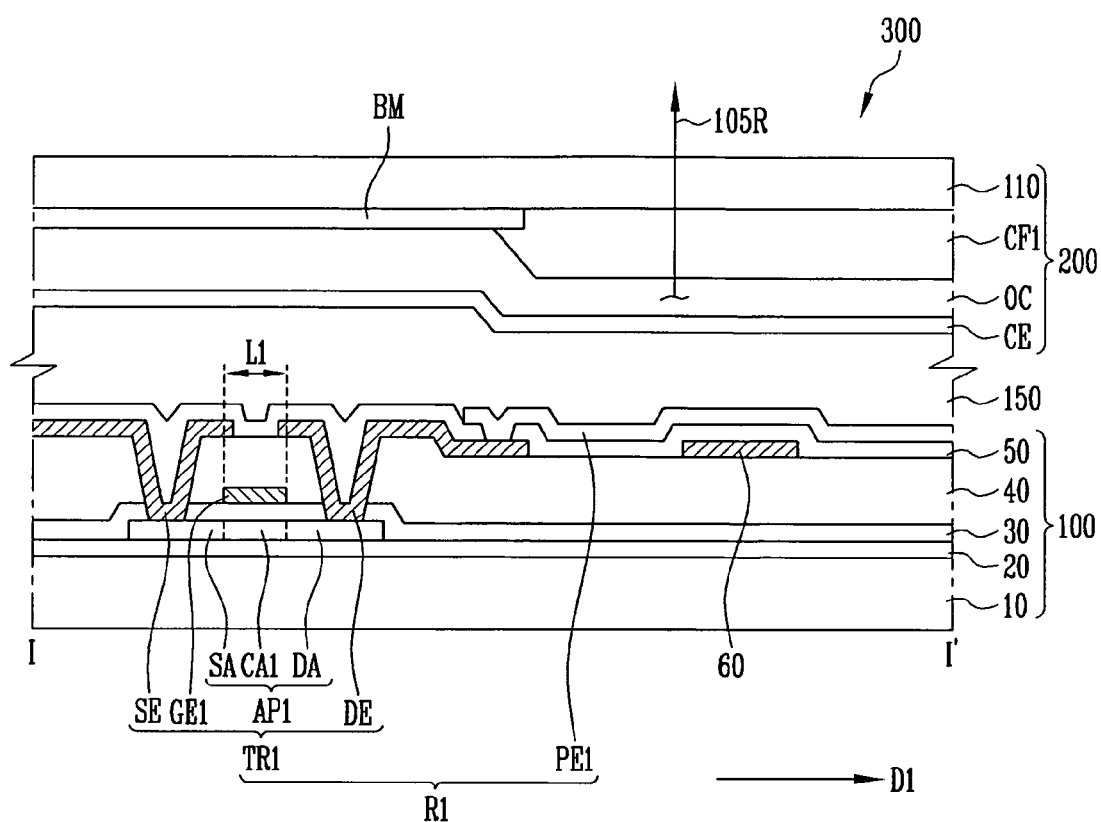
FIG. 2 illustrates a cross-sectional view showing a portion cut off along a line I-I' of FIG. 1.
Figure 2:
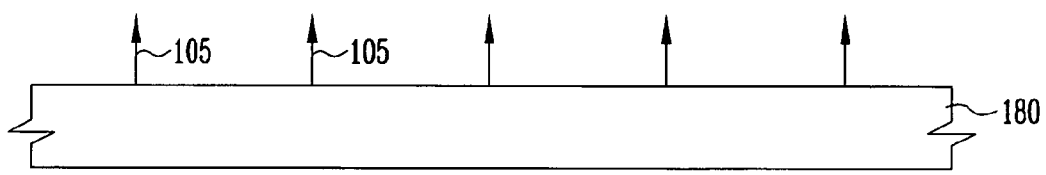

FIG. 1 is a plan view showing a unit pixel of a display apparatus according to an embodiment, and FIG. 2 is a cross-sectional view of a portion cut off along the line I-I' of FIG. 1. Although the display apparatus 300 includes more unit pixels, other than the unit cell shown in FIG. 1, the other unit pixels not shown in FIG. 1 have the same structure as or similar to that of the unit pixel shown in FIG. 1. Therefore, the description of the other unit pixels is not provided, in describing FIG. 1.

Referring to FIGS. 1 and 2, the display apparatus 300 may include a first substrate 100, a second substrate 200, and a light source 180.

The first substrate 100 may include a first base substrate 10, a gate line GL, a plurality of data lines, e.g., first to fifth data lines DL, DL2, DL3, DL4, and DL5, and a unit pixel implemented by a plurality of color pixels and white pixels W1.

The gate line GL may extend in a first direction D1. The first to fifth data lines DL, DL2, DL3, DL4, and DL5 may be spaced apart from each other and may extend in a second direction D2 perpendicular to the first direction D1. Where the gate line GL and two adjacent data lines intersect each other may define the position where one color pixel of the color pixels is disposed on the first substrate 100. For example, the position of a red pixel R1 on the first substrate 100 may be defined by the gate line GL and the first and second data lines DL1 and DL2, which intersect each other.

In the embodiment shown in FIG. 1, the color pixels may include a red pixel R1, a green pixel G1, and a blue pixel B1. The red pixel R1, green pixel G1, blue pixel B1, and white pixel W1 may be sequentially arranged in the first direction D1.

Before describing the structure of the color pixels, the red pixel R1, green pixel G1, and blue pixel B1, except for the white pixel W1, may have the same structure. Therefore, the red pixel R1 is described as an example with reference to FIG. 2, and the description of the green pixel G1 and blue pixel B1 is not provided for ease of explanation. The structure of the white pixel W1 is described with reference to FIG. 4.

Referring to FIG. 2, a buffer layer 20 may be on the first base substrate 10. The buffer layer 20 may contain, e.g., silicon oxide (SiOx) or silicon nitride (SiNx). The buffer layer 20 may reduce and/or prevent impurities from flowing from the first base substrate 10 to the red pixel R1.

The red pixel R1 may be on the buffer layer 20. The red pixel R1 may include a first thin film transistor TR1 and a first pixel electrode PE1 electrically connected with the first thin film transistor TR1.

The first thin film transistor TR1 may include a first active pattern AP1, a first gate electrode GE1 diverging from the gate line GL and overlapping the first active pattern AP1, a source electrode SE diverging from the first data line DL1 and contacting with the first active pattern AP1, and a drain electrode DE spaced apart from the source electrode SE and contacting the first active pattern AP1.

The first active pattern AP1 may be on the buffer layer 20 and may include a first channel area CA1, a source area SA, and a drain area DA. The first channel area CA1 of the first active pattern AP1 may be the part overlapping the first gate electrode GE1 in a plane. The source area SA and the drain area DA may face each other, with the first channel area CA1 therebetween. Further, the source area SA may be in contact with the source electrode SE and the drain area DA may be in contact with the drain electrode DE.

The first gate electrode GE1 may have a dual gate structure, in which the first gate electrode GE1 may have two parts diverging from the gate line GL and overlapping the first active pattern AP1.

A storage electrode 80 may be on the second insulating layer 40 and a third insulating layer 50 may be on the first thin film transistor TR1 and the storage electrode 60. The storage electrode 60 may form a storage capacitor by overlapping the first pixel electrode PE1, with the third insulating layer 50 therebetween. Further, when the first pixel electrode PE1 is on the third insulating layer 50, the first pixel electrode PE1 may be electrically connected with the drain electrode DE through a contact hole formed through the third insulating layer 50.

Referring to FIGS. 1 and 2, the first gate electrode GE1 may have a first length L1 in the first direction D1. Further, as described above, the first channel area CA1 of the first active pattern AP1 may be the part overlapping the first gate electrode GE1 in a plane, such that the length of the first channel area CA is substantially the same as the first length L1 of the first gate electrode GE1.

The white pixel W1 may include a second thin film transistor TR2 and a fourth pixel electrode PE4 electrically connected with the second thin film transistor TR2.

The second thin film transistor TR2 may include a second active pattern AP2, a second gate electrode GE2 diverging from the gate line GL and overlapping the second active pattern AP2, a source electrode SE diverging from the fourth data line DL4 and contacting the second active pattern AP2, and a drain electrode DE spaced apart from the source electrode SE and contacting the second active pattern AP2. The structure of the second thin film transistor is described in more detail with reference to FIG. 4.

The structure of the second substrate 200 corresponding to the red pixel R1 may be as follows. The second substrate 200 may include a second base substrate 110, a light shielding layer BM, a red filter CF1, a planarizing layer OC, and a common electrode CE. The light shielding layer BM may be on one side of the second base substrate 110, opposite to the first thin film transistor TR1, and may block source light 105 from the light source 180.

The red filter CF1 may be on one side of the second base substrate 110, opposite to the first pixel electrode PE1, and may filter the source light 105 from the light source 180 into a red light 105R.

The planarizing layer OC may reduce a step formed by a difference in thickness between the light shielding layer BM and the red filter CF1, by covering the light shielding layer BM and the red filter CF1. Further, the common electrode CE may generate an electric field with the first pixel electrode PE1, on one side of the planarizing layer OC, such that the phase of the liquid crystal 150 may be changed by the electric field.

The light source 180 may produce the source light 105 and send the source light 105 to the first substrate 100 and the second substrate 200. The source light 105 may be a white light. The display apparatus 300 may display an image using the source light 105.

Figure 3:
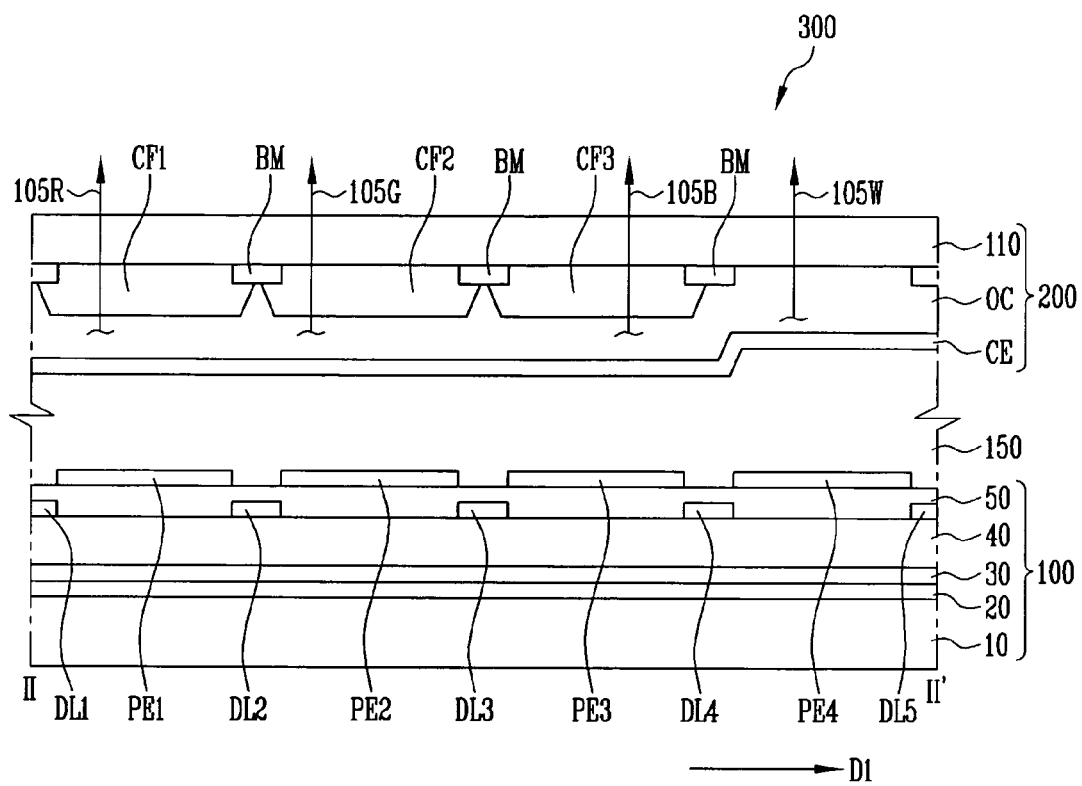
FIG. 3 illustrates a cross-sectional view showing a portion cut off along a line II-II' of FIG. 1.
Figure 3:
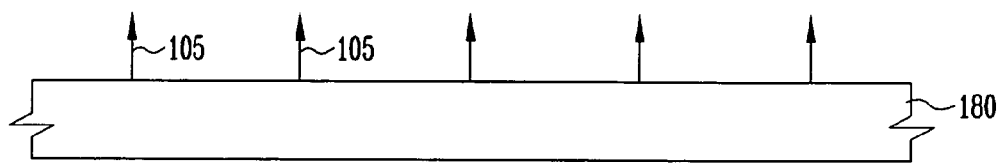

FIG. 3 is a cross-sectional view showing a portion cut off along the line II-IF of FIG. 1.

Referring to FIG. 3, the first to fifth data lines DL1, DL2, DL3, DL4, and DL5 may be on the second insulating layer 40 while the third insulating layer 50 covers the first to fifth data lines DL1, DL2, DL3, DL4, and DL5.

The first pixel electrode PE1 may be on the third insulating layer 50, between the first data line DL1 and the second data line DL2. The second pixel electrode PE2 may be on the third insulating layer 50, between the second data line DL2 and the third data line DL3. The third pixel electrode PE3 may be on the third insulating layer 50, between the third data line DL3 and the fourth data line DL4. The fourth pixel electrode PE4 may be on the third insulating layer 50, between the fourth data line DL4 and the fifth data line DL5.

The red filter CF1, green filter CF2, and blue filter CF3 may be on the second base substrate 110, with the red filter CF1 opposite to, e.g., facing, the first pixel electrode PE1, the green filter CF2 opposite to, e.g., facing, the second pixel electrode PE2, and the blue filter CF3 opposite to, e.g., facing, the third pixel electrode PE3.

The red filter CF1 filters the source light 105 into a red light 105R, the green filter CF2 filters the source light 105 into a green light 105G, and the blue filter CF3 filters the source light 105 into a blue light 105B. Therefore, the display apparatus 300 may output a first white light produced when the red light 105R, green light 105G, and blue light 105B are mixed.

Color filters are not disposed at the position opposite to, e.g., facing, the fourth pixel electrode PE4, on one side of the second base substrate 110. Therefore, the source light 105 passing through the fourth pixel electrode PE 4 does not pass through a color filter, such that the source light 105 may become a second white light 105W that travels outside through the second substrate 200, without a change in color. Therefore, the unit pixel of the display apparatus 300 may output the second white light 105W that travels outside sequentially through the fourth pixel electrode PE4 and the second substrate 200 of the white pixel (W1 in FIG. 1), other than the first white light being produced when the red light 105R, green light 105G, and blue light 105B are mixed.

Figure 4:
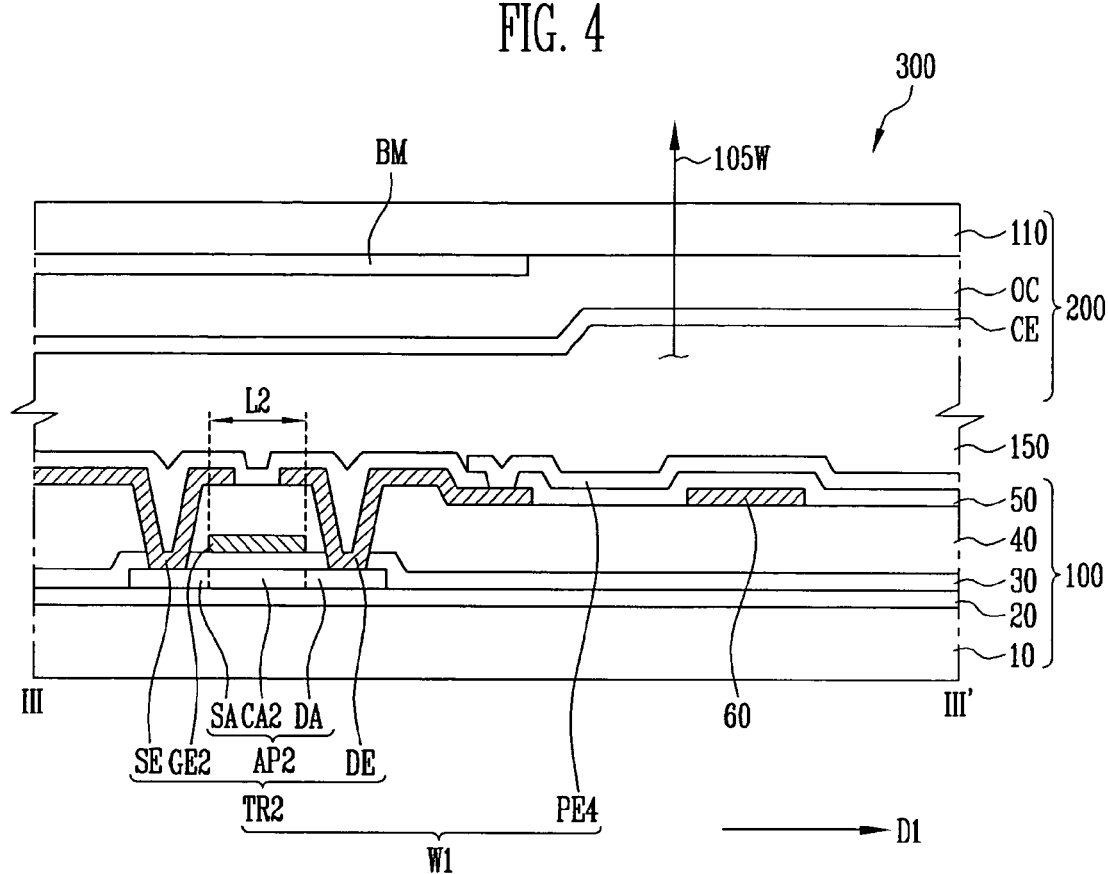
FIG. 4 illustrates a cross-sectional view showing a portion cut off along a line III-III' of FIG. 1.
Figure 4:
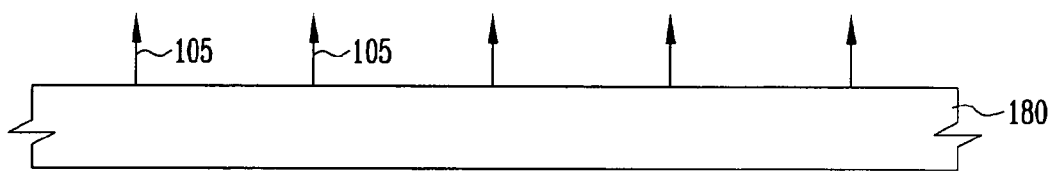

FIG. 4 is a cross-sectional view showing a portion cut off along the line III-III' of FIG. 1.

Referring to FIG. 4, the white pixel W1 may include a second thin film transistor TR2 and a fourth pixel electrode PE4 electrically connected with the second thin film transistor TR2.

The second thin film transistor TR2 may include a source electrode SE, a drain electrode DE, a second gate electrode GE2, and a second active pattern AP2. The second active pattern AP2 may include a source area SA in contact with the source electrode SE, a drain area DA in contact with the drain electrode DE, and a second channel area CA2 overlapping the second gate electrode GE2. The second channel area CA2 may be between the source area SA and the drain area DA.

Referring to FIGS. 2 and 4, the second gate electrode GE2 may have a second length L2 in the first direction D1, and the second length L2 may be larger than the first length L1 of the first gate electrode GE1. Further, since the length of the second channel part CA2 overlapping the second gate electrode GE2, in the second active pattern AP2, may be substantially the same as the second length L2, the length of the second channel CA2 may be the same as the second length L2. Consequently, the second length L2 of the second channel CA2 may be larger than the first length L1 of the first channel part CA1.

The electrical properties of the second thin film transistors TR2 may be different from the electrical properties of the first thin film transistor TR1, when the length of the second channel part CA2 is larger than the length of the first channel part CA 1. In more detail, since the length of the second channel part CA2 may be larger than the length of the first channel part CA1, the electric resistance of the second channel area CA2 may be larger than the electric resistance of the first channel area CA1, such that the on-current Ion of the second thin film transistor TR2 may be smaller than the on-current of the first thin film transistor TR1, when the same current is applied to the source electrode of the first thin film transistor TR1 and the source electrode of the second thin film transistor TR2.

The structure of the second substrate 200 corresponding to the white pixel W1 may be as follows. The second substrate 200 may include a second base substrate 110, a light shielding layer BM on the second substrate 110, opposite to the second thin film transistor TR2, a planarizing layer OC covering the light shielding layer BM, and a common electrode CE on the planarizing layer OC. Further, color filters are not disposed at the position opposite to the fourth pixel electrode PE4 on one side of the second base substrate 110. The source light 105 from the light source 180 may become the second white light 105W traveling outside through the second substrate 200, without a change in color through the white pixel W1.

In the display apparatus including a unit pixel that is implemented by a red pixel outputting a red light, a green pixel outputting a green light, a blue pixel outputting a blue light, and a white pixel outputting a white light, when a white light is emitted from a light source to the outside without being filtered through a color filter, the luminance of the white light may be larger than the luminance of a white light produced when the red light, green light, and blue light are mixed. Therefore, in such an arrangement, white lights having different luminance are outputted from one unit pixel, such that color irregularity may be generated, in full white display. However, according to an exemplary embodiment, as described above, it is possible to reduce the luminance of the second white light 105W outputted from the white pixel W1, when reducing the magnitude of the on-current Ion of the second thin film transistor TR2. As a result, the display apparatus 300 may output the first white light described with reference to FIG. 3 and the second white light 105W having the same luminance and gray scale as those of the first white light, using one unit pixel, such that it is possible to reduce and/or prevent color irregularity.

Since the second width L2 may be larger than the first width L1, the area of the second active pattern AP2 which is covered by the second gate electrode GE2 may be larger than the area of the first active pattern AP1 which is covered by the first gate electrode GE1. Therefore, the amount of source light 105 irradiated to the first active pattern AP1 is smaller than the amount of source light 105 irradiated to the second active pattern AP2. Assuming that the leakage current from the first active pattern AP1 by a photoelectric effect is defined as first leakage current and the leakage current from the second active pattern AP2 is defined as second leakage current, the magnitude of the second leakage current may be smaller than the first leakage current.

As described above, when the magnitude of the second leakage current is smaller than the magnitude of the first leakage current, the magnitude of the on-current of the second thin film transistor TR2 may become smaller than the magnitude of the on-current of the first thin film transistor TR1, substantially as much as the difference between the magnitude of the second leakage current and the magnitude of the first leakage current. Therefore, the luminance of the second white light 105W implemented by the on-current of the second thin film transistor TR2 may reduce, such that the color irregularity can be reduced and/or prevented.

Figure 5:
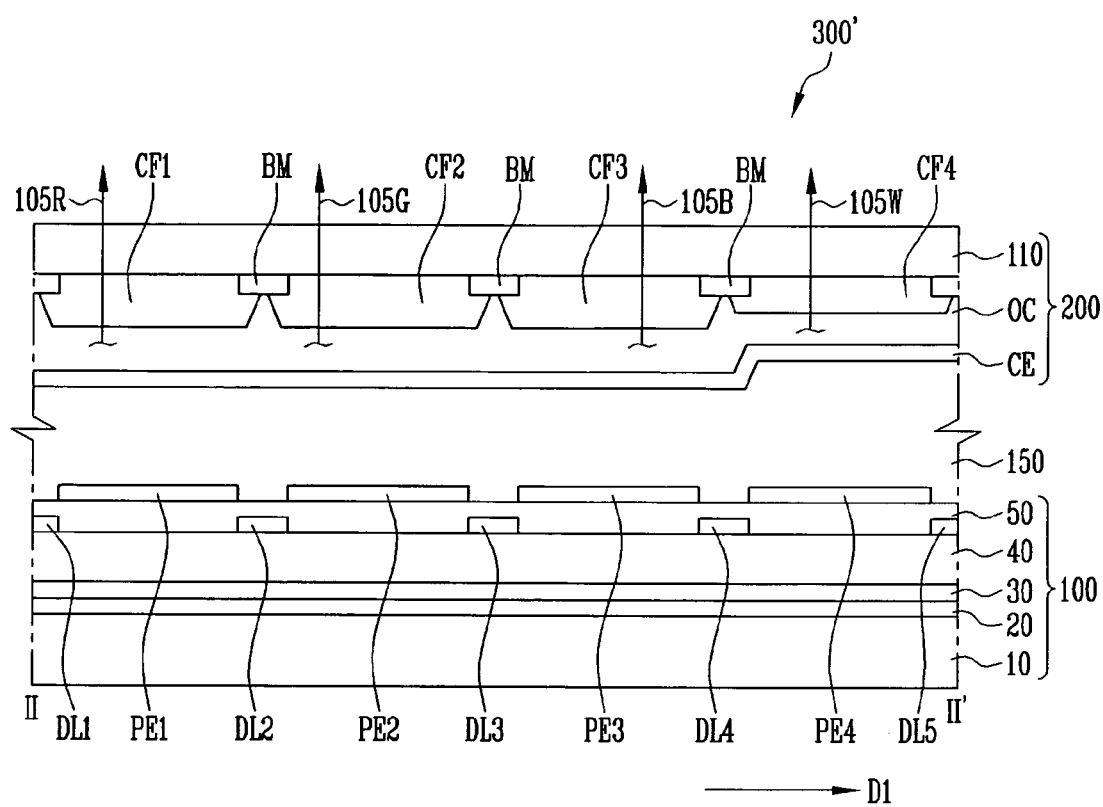
FIG. 5 illustrates a cross-sectional view of a display apparatus, according to an exemplary embodiment.
Figure 5:
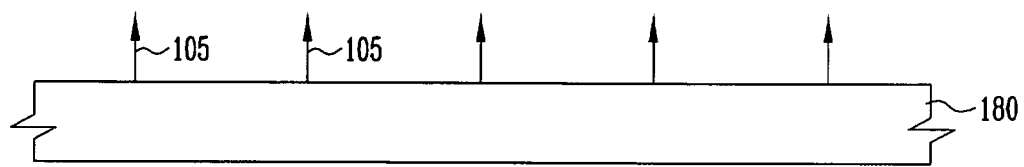

FIG. 5 is a cross-sectional view of a display apparatus according to another exemplary embodiment. Meanwhile, the display apparatus 300' shown in FIG. 5 further includes a white filter CF4, as a component, as compared with the display apparatus (300 in FIGS. 1 to 4) which has been described with reference to FIGS. 1 to 4. Therefore, the components described above with reference to FIGS. 1 to 4 are designated by the same reference numerals and a repeated description for the components is not provided, in describing FIG. 5.

Referring to FIGS. 1 and 5, the display apparatus 300' may include a first substrate 100 and a second substrate 200, in which the second substrate 200 includes a red filter CF1 opposite to, e.g., facing, a first pixel electrode PE1 of a red pixel R1, a green filter CF2 opposite to a second pixel electrode PE2 of a green pixel G1, and a blue filter CF3 opposite to a third pixel electrode PE3 of a blue pixel B1, and a white filter CF4 opposite to a fourth pixel electrode PE4 of a white pixel W1.

The white filter CF4 may include an organic substance having good light transmittance and filters source light 105 from a light source 180 into a white light 105W.

Meanwhile, the larger the thickness of the white filter CF4, the more the luminance of the white light 105W may reduce. Therefore, it is possible to reduce the luminance of the white light 105W by increasing the thickness of the white filter CF4, without applying the means described above with reference to FIGS. 1 to 4, which can reduce and/or prevent color irregularity, to the display apparatus 300'. However, the thickness of the white filter CF4 may be larger than the thicknesses of the red filter CF1, green filter CF2, and blue filter CF3, in this case.

Therefore, in the embodiment shown in FIG. 5, it is possible to reduce the luminance of the white light 105W by forming the white filter CF4 having a thickness the same as or larger than those of the red filter CF1, green filter CF2, and blue filter CF3, on the second substrate 200 while applying the means described above with reference to FIGS. 1 to 4, which may reduce and/or prevent color irregularity, to the display apparatus 300'.

Figure 6:
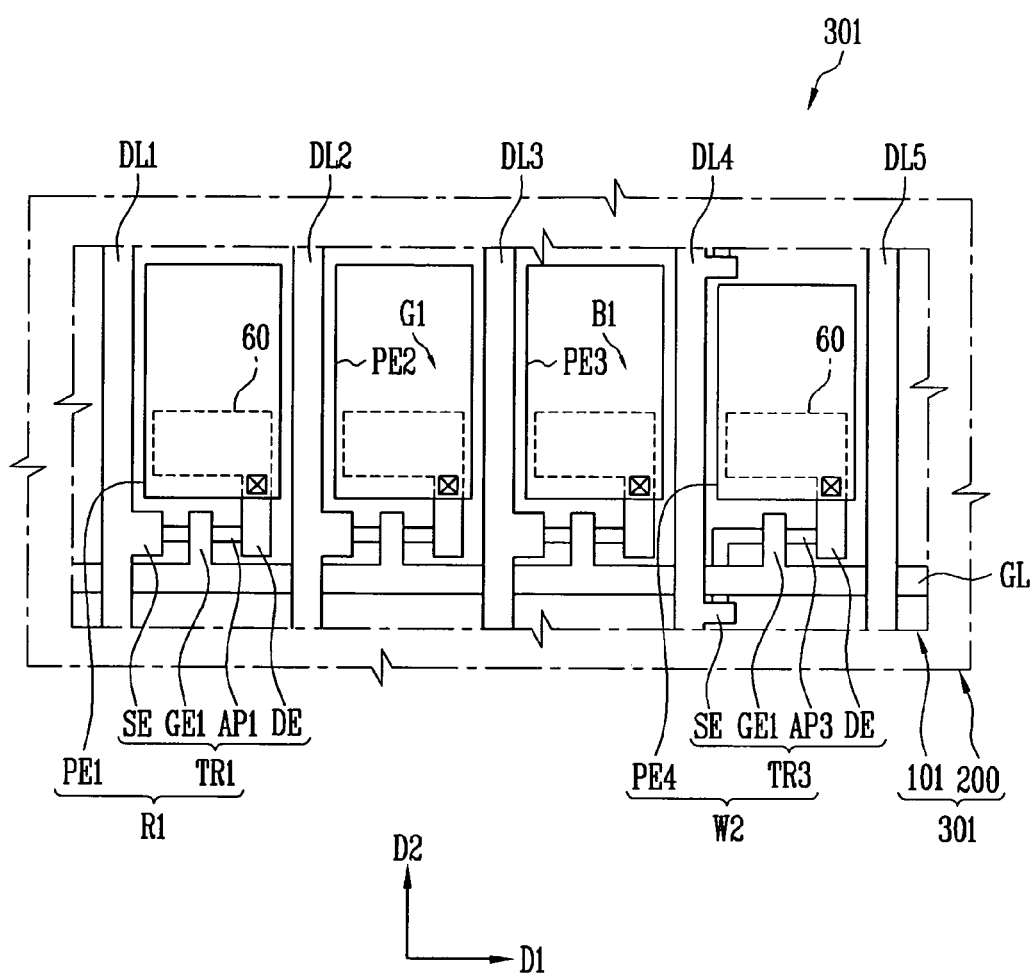
FIG. 6 illustrates a plan view of a display apparatus, according to an exemplary embodiment.

FIG. 6 is a plan view of a display apparatus according to another exemplary embodiment. The display apparatus 301 shown in FIG. 6 includes the same components as those of the display apparatus (300 in FIG. 1) shown in FIG. 1, except for the white pixel W2. Therefore, in describing FIG. 6, the structure of the white pixel W2 is described, the other components are designated by the same reference numerals, and the repeated description of the components is not provided.

Referring to FIG. 6, the display apparatus 301 may include a first substrate 101 and a second substrate 200, and the white pixel W2 may include a third thin film transistor TR3 and a fourth pixel electrode PE4 electrically connected to the third thin film transistor TR3.

The third thin film transistor TR3 may include a first gate electrode GE1, a source electrode SE, a drain electrode DE, and a third active pattern AP3.

The first gate electrode GE1 may diverge from the gate line GL, overlapping the third active pattern AP3. The source electrode SE may diverge from the fourth data line DL4, overlapping the third active pattern AP3. The drain electrode DE may be spaced apart from the source electrode SE, overlapping the third active pattern AP3.

The first active pattern AP1 may extend in a first direction D1. However, the third active pattern AP3 may extend in the first direction D1 and a second direction D2 perpendicular to the first direction D1. As a result, the electrical properties of the first thin film transistor TR1 may be different from the electrical properties of the third thin film transistor TR3, when the first active pattern AP1 and the third active pattern AP3 have, e.g., anisotropic crystals. This is described in more detail with reference to FIGS. 7A and 7B.

Figure 7A:
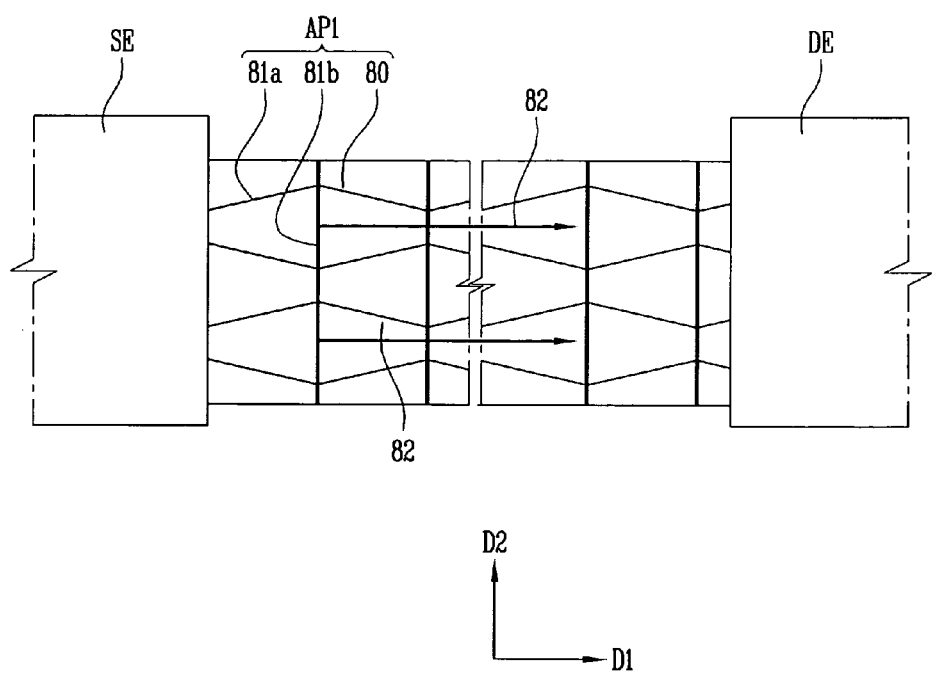
FIG. 7A illustrates a view enlarging the first active pattern shown in FIG. 6.
Figure 7B:
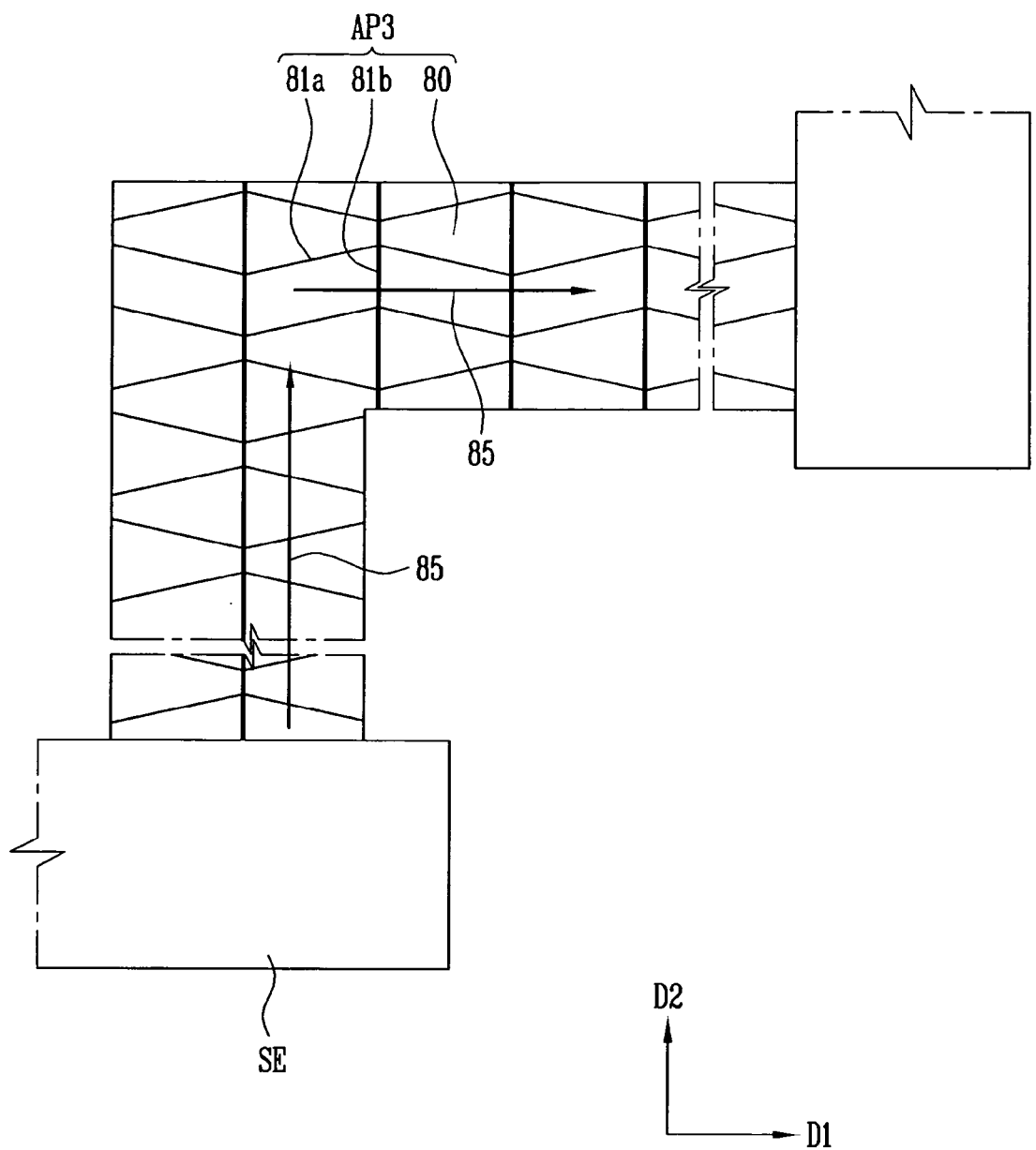
FIG. 7B illustrates a view enlarging the third active pattern shown in FIG. 6.

FIG. 7A is a view enlarging the first active pattern shown in FIG. 6, and FIG. 7B is a view enlarging the third active pattern shown in FIG. 6.

Referring to FIG. 7A, the first active pattern AP1 may include a plurality of silicon crystals 80 and the silicon crystals 80 may have anisotropy. In more detail, the silicon crystals 80 may grow in the first direction, and the longitudinal directions of the silicon crystals 80 may be substantially parallel with the first direction D1.

In the embodiment shown in FIG. 7A, the silicon crystals 80 may be crystallized by, e.g., SLS (Sequential Lateral Solidification) to provide the silicon crystals 80 with anisotropy. The SLS, one of the methods that crystallize amorphous silicon, may use laser beams and may use the characteristic that silicon crystals grow perpendicular to the interface between liquid-state silicon and solid-state silicon, for crystallization.

The SLS grows the silicon crystals at a predetermined length to a side by adjusting the irradiation range of the laser beams, using a mask. For example, though not shown in detail in FIG. 7A, a mask with a slit having a long axis in the second direction D2 is disposed on the first active pattern AP1 and laser beams are irradiated from above the mask to the first active pattern AP1 along the slit, such that the laser beams passing through the slit partially melts the first active pattern AP1. As a result, the silicon crystals grow substantially in the first direction D1 perpendicular to the second direction D2 in the first active pattern AP1.

First grain boundaries 81a and second grain boundaries 81b may be formed at the interfaces of the silicon crystals 80, when the silicon crystals 80 are formed by the SLS. The second grain boundaries 81b of the grain boundaries may be positioned at the region where the laser beam has been irradiated, the first grain boundaries 81a may be arranged more densely than the second grain boundaries 81b, and projections (not shown) that reduce electrophoretic mobility of the first active pattern AP1 may be formed along the positions of the first grain boundaries 81a and the second grain boundaries 81b.

First current 82 may flow from the source electrode SE to the drain electrode DE in the first active pattern AP1, when the first thin film transistor TR1 is turned on. Further, since the first active pattern AP1 may extend in the first direction D1, the first current 82 may substantially flow in the first direction D1 in the first active pattern AP1.

Referring to FIG. 7B, the third active pattern AP3 may include anisotropic silicon crystals 80a, similar to the first active pattern AP1.

Second current 85 may flow from the source electrode SE to the drain electrode DE in the second active pattern AP2, when the second thin film transistor TR2 is turned on. Further, since the third active pattern AP3 may extend in the first direction D1 and the second direction D2 perpendicular to the first direction D1, the second current 85 may substantially flow from the first direction D1 to the second direction D2 in the third active pattern AP3.

Referring to FIG. 7A again, the first current 82 may flow in the growing direction of the silicon crystals 80, when flowing in the first direction D1. However, the second current 85 may flow across the growing direction of the silicon crystals 80, when flowing in the second direction D2, such that the flow of the second current 85 may be disturbed by the projections at the first grain boundaries 81*a*, which are arranged more densely than the second grain boundaries 81*b*, more than the first current 82.

Therefore, the magnitude of the on-current of the third thin film transistor TR3 having the third active pattern AP3 may be smaller than the magnitude of the on-current of the first thin film transistor TR1 having the first active pattern AP1. Accordingly, the luminance of the white light outputted from the white pixel W2 having the third thin film transistor TR3 may be reduced, such that it is possible to reduce and/or prevent the color irregularity described above.

Figure 8:
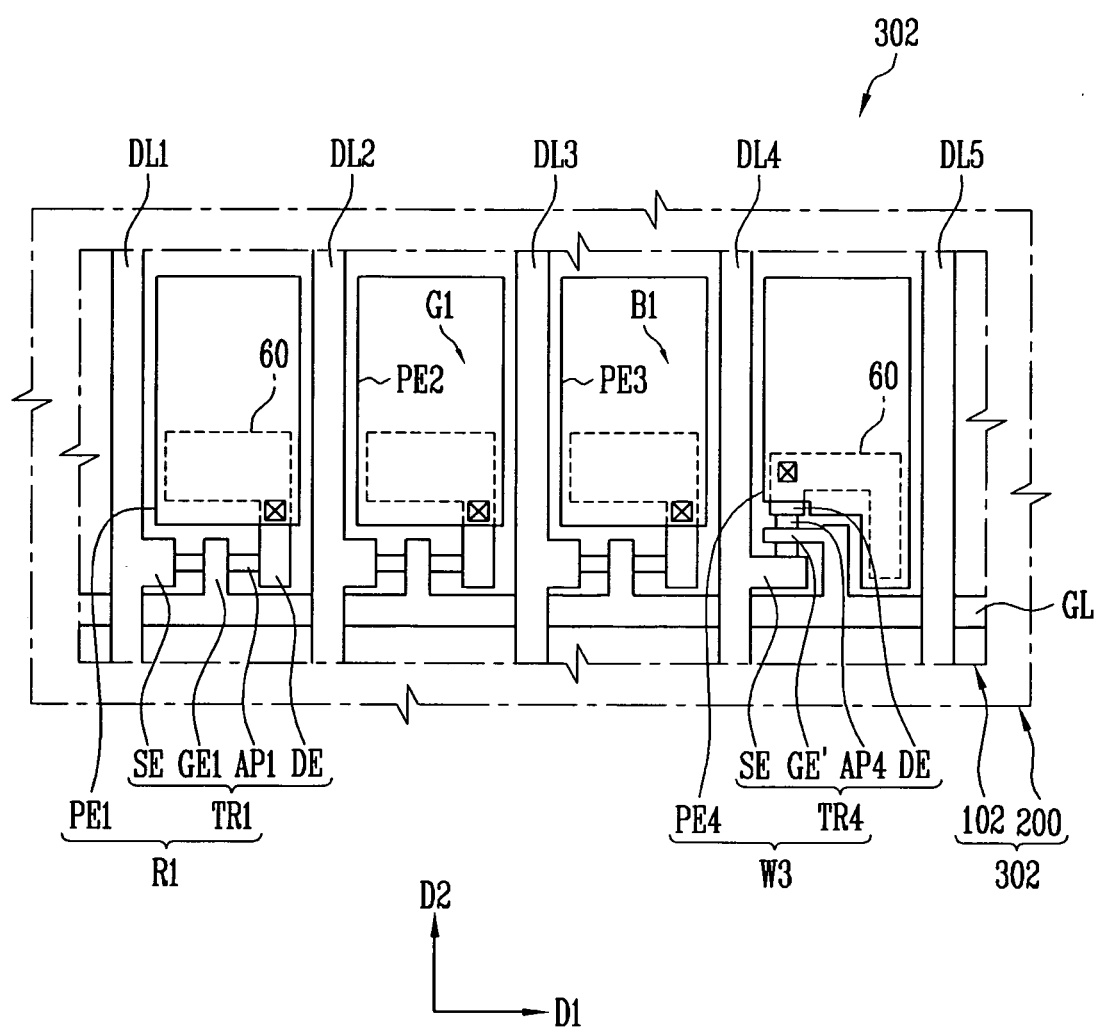
FIG. 8 illustrates a plan view of a display apparatus, according to an exemplary embodiment.

FIG. 8 is a plan view of a display apparatus according to another exemplary embodiment, and FIG. 9 is a view enlarging the fourth active pattern shown in FIG. 8. The display apparatus 302 shown in FIG. 8 may include the same components as those of the display apparatus (301 in FIG. 6) shown in FIG. 6, except for the white pixel W3. Therefore, in describing FIG. 8, the structure of the white pixel W3 is mainly described, the other components are designated by the same reference numerals, and the repeated description of the components is not provided.

Referring to FIG. 8, the display apparatus 302 may include a first substrate 102 and a second substrate 200, the white pixel W2 on the first substrate 102 may include a fourth thin film transistor TR4 and a fourth pixel electrode PE4 electrically connected with the fourth thin film transistor TR4. The fourth thin film transistor TR4 may include a gate electrode GE, a source electrode SE, a drain electrode DE, and a fourth active pattern AP4.

The first active pattern AP1 may extend in a first direction D1, whereas the fourth active pattern AP4 extends in a second direction D2. As a result, the electrical properties of the first thin film transistor TR1 may be different from the electrical properties of the fourth thin film transistor TR4, when the first active pattern AP1 and the fourth active pattern AP4 have anisotropic semiconductor crystals. This is described in more detail with reference to FIG. 9.

Referring to FIG. 9, the fourth active pattern AP4 may include anisotropic silicon crystals 80. The silicon crystals 80 may be formed by the SLS described with reference to FIGS. 7A and 7B. Further, the silicon crystals 80 may grow in the first direction D1 such that the longitudinal directions of the silicon crystals 80 may be substantially parallel with the first direction D1.

As described above with reference to FIGS. 7A and 7B, when the silicon crystals 80 grow substantially in the first direction D1, second grain boundaries 81*b* parallel with the second direction D2 perpendicular to the first direction D1 and first grain boundaries 81*a* intersecting the second grain boundaries 81*b* may be formed, and projections (not shown) that reduce electrophoretic of the fourth active pattern AP4 may be formed along the positions of the first grain boundaries 81*a* and the second grain boundaries 81*b*.

Referring to FIG. 9, a current 88 may flow from the source electrode SE to the drain electrode DE in the fourth active pattern AP4 and the fourth active pattern AP4 may extend in the second direction D2, such that the current 88 may flow substantially in the second direction D2 in the fourth active pattern AP4. Therefore, the current 88 may intersect the growing direction of the silicon crystals 80, such that the flow of the current 88 may be disturbed by the projections at the first grain boundaries 81*a* arranged more densely than the second grain boundaries 81*b*.

Therefore, the magnitude of the on-current of the fourth thin film transistor TR4 having the fourth active pattern AP4 having the structure described above may be smaller than the magnitude of the on-current of the first thin film transistor TR1 having the first active pattern AP1. Accordingly, the luminance of the white light outputted from the white pixel W3 having the fourth thin film transistor TR4 may be reduced, such that it is possible to reduce and/or prevent the color irregularity described above.

The fourth active pattern AP4 may extend only in the second direction D2, while the third active pattern (AP3 in FIG. 7B) shown in FIG. 7B may extend in the first direction D1 and the second direction D2. As described above, when current flows in the second direction D2 in the third active pattern AP3 or the fourth active pattern AP4, the flow of the current may be more disturbed by the projections at the first grain boundaries 81*a*. Therefore, the area of the portion extending in the second direction D2 of the fourth active pattern AP4 may be larger than that of the third active pattern AP3, such that the on-current of the fourth thin film transistor TR4 may be smaller than the on-current of the third thin film transistor TR3.

By way of summation and review, display apparatuses may include unit pixels that are implemented by red pixels, green pixels, and blue pixels. The display apparatuses may further include white pixels, other than the red pixels, green pixels, and blue pixels, in the unit pixels, for displaying images. The white pixels are capable of improving the luminance of the images as compared to display apparatuses that do not include the white pixels.

However, when white light produced by mixing of the light emitted from the red pixel, green pixel, and blue pixel and white light from the white pixel are outputted from the unit pixel, e.g., when full white is implemented by the unit pixels, color irregularity may be generated by a difference in luminance of the white lights.

Features of the embodiments provide a display apparatus having improved display quality by reducing and/or preventing the color irregularity. In particular, the display apparatus may include a first substrate and a second substrate opposite to the first substrate. The first substrate may include a plurality of color pixels and a white pixel. The white pixel may output a second white light having the same gray scale as the gray scale of a first white light formed by mixing light outputted from the color pixels, and may be operated by a second current lower than a first current that activates the color pixels.

In a unit pixel implemented by a red pixel, a green pixel, a blue pixel, and a white pixel, a first white light formed by mixing the light outputted from the red pixel, the green pixel, and the blue pixel may be smaller in luminance than a second white light outputted from the white pixel. However, according to an embodiment, it is possible to allow the second white light to have the same gray scale as that of the first white light and allow the second white light to have substantially the same luminance as that of the first white light, by making the magnitude of current activating the white pixel smaller than the magnitude of current activating the red pixel, the green pixel, and the blue pixel. Therefore, it is possible to improve display quality of the display apparatus by reducing and/or preventing color irregularity due to a difference in luminance of the first white light and the second white light.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A display apparatus, comprising:
    a first substrate; and
    a second substrate opposite to the first substrate,
    wherein the first substrate includes:
        a red pixel activated by a first current, wherein the red pixel includes a first thin film transistor and a first pixel electrode electrically connected with the first thin film transistor, and the first thin film transistor includes a first active pattern, a first gate electrode, a first source electrode and a first drain electrode;
        a green pixel activated by a second current, wherein green pixel includes a second thin film transistor and a second pixel electrode electrically connected with the second thin film transistor, and the second thin film transistor includes a second active pattern, a second gate electrode, a second source electrode and a second drain electrode;
        a blue pixel activated by a third current, wherein the blue pixel includes a third thin film transistor and a third pixel electrode electrically connected with the third thin film transistor, and the third thin film transistor includes a third active pattern, a third gate electrode, a third source electrode and a third drain electrode; and
        a white pixel activated by a fourth current, wherein the white pixel includes a fourth thin film transistor and a fourth pixel electrode electrically connected with the fourth thin film transistor, and the fourth thin film transistor includes a fourth active pattern, a fourth gate electrode, a fourth source electrode and a fourth drain electrode,
    wherein a length of the fourth gate electrode overlapped with a fourth active pattern in a flowing direction of the fourth current is larger than a length of the first gate electrode in a flowing direction of the first current, a length of the second gate electrode in a flowing direction of the second current, and a length of the third gate electrode in a flowing direction of the third current.

2. The display apparatus according to claim 1, wherein:
    the white pixel, the red pixel, the green pixel, and the blue pixel form a unit pixel.

3. The display apparatus according to claim 2, wherein:
    the first thin film transistor, the second thin film transistor and the third thin film transistor switch the first current, the second current and the third current, and the first active pattern, the second active pattern and the third active pattern include a portion extending in a first direction, respectively; and
    the fourth thin film transistor switches the fourth current and the second active pattern includes a portion extending in a second direction different from the first direction; and
    the first active pattern, the second active pattern, the third active pattern and the fourth active pattern each include anisotropic semiconductor crystals.

4. The display apparatus according to claim 3, wherein longitudinal directions of the anisotropic semiconductor crystals are parallel with the first direction.

5. The display apparatus according to claim 4, wherein the first current flows in the first direction in the first active pattern, the second current flows in the first direction in the second active pattern, the third current flows in the first direction in the third active pattern, and the fourth current flows in the second direction in the fourth active pattern.

6. The display apparatus according to claim 5, wherein the fourth active pattern further includes a portion extending in the first direction, and a luminance of a white light from the white pixel is reduced when a magnitude of the fourth current is reduced as the portion extending in the second direction is larger than the portion extending in the first direction.

7. The display apparatus according to claim 6, wherein the first direction and the second direction are perpendicular in a plane.

8. The display apparatus according to claim 1, wherein an electrical resistance of a channel area of the fourth active pattern overlapping the fourth gate electrode is larger than an electrical resistance of a channel area of the first active pattern overlapping the first gate electrode, an electrical resistance of a channel area of the second active pattern overlapping the second gate electrode, and an electrical resistance of a channel area of the third active pattern overlapping the third gate electrode.

9. The display apparatus according to claim 1, further comprising:
    a liquid crystal layer between the first substrate and the second substrate; and
    a light source emitting light toward the first substrate and the second substrate.

* * * * *